United States Patent
Jo et al.

(10) Patent No.: US 11,142,670 B2
(45) Date of Patent: Oct. 12, 2021

(54) MULTILAYER MARKING FILM AND MANUFACTURING METHOD FOR MULTILAYER MARKING FILM

(71) Applicant: LG Chem, Ltd., Seoul (KR)

(72) Inventors: Myung Hyun Jo, Daejeon (KR); Joo Hee Hong, Daejeon (KR); Jang Soon Kim, Daejeon (KR); Hong Kwan Cho, Daejeon (KR)

(73) Assignee: LG Chem, Ltd.

( * ) Notice: Subject to any disclaimer, the term of this patent is extended or adjusted under 35 U.S.C. 154(b) by 93 days.

(21) Appl. No.: 16/092,592

(22) PCT Filed: Apr. 12, 2017

(86) PCT No.: PCT/KR2017/003970
§ 371 (c)(1),
(2) Date: Oct. 10, 2018

(87) PCT Pub. No.: WO2017/179910
PCT Pub. Date: Oct. 19, 2017

(65) Prior Publication Data
US 2019/0136093 A1    May 9, 2019

(30) Foreign Application Priority Data
Apr. 12, 2016  (KR) .................. 10-2016-0045164

(51) Int. Cl.
*C09J 7/20* (2018.01)
*C09J 7/29* (2018.01)
(Continued)

(52) U.S. Cl.
CPC ................. *C09J 7/29* (2018.01); *B32B 27/16* (2013.01); *B32B 27/20* (2013.01); *B32B 38/00* (2013.01);
(Continued)

(58) Field of Classification Search
CPC ......... B32B 27/16; B32B 27/20; B32B 38/00; B32B 38/10; C09J 7/20; C09J 7/29;
(Continued)

(56) References Cited

U.S. PATENT DOCUMENTS

2003/0031861 A1    2/2003 Reiter et al.
2004/0209086 A1   10/2004 Koops et al.
(Continued)

FOREIGN PATENT DOCUMENTS

CN    102950850 A      3/2013
JP    H09279076 A     10/1997
(Continued)

OTHER PUBLICATIONS

Machine Translation of JP 2002-332465 (Year: 2002).*
(Continued)

*Primary Examiner* — Gerard Higgins
(74) *Attorney, Agent, or Firm* — Lerner, David, Littenberg, Krumholz & Mentlik, LLP

(57) ABSTRACT

An exemplary embodiment of the present invention provides a multilayer marking film including: an adhesive layer; a colored base layer having a first color; and a colored coating layer having a second color, in which the first color and the second color are different from each other, the colored coating layer, the colored base layer, and the adhesive layer are sequentially provided, the colored base layer includes a cured material of a base composition including: a urethane (meth)acrylate oligomer; a (meth)acrylate monomer including one or more selected from the group consisting of a
(Continued)

cyclo-aliphatic (meth)acrylate monomer, an epoxy-based (meth)acrylate monomer, an aliphatic (meth)acrylate monomer, and a polyol-based (meth)acrylate monomer; and a pigment, and the colored coating layer is etched by laser irradiation.

13 Claims, 3 Drawing Sheets

(51) Int. Cl.
    *G09F 3/10* (2006.01)
    *B32B 38/00* (2006.01)
    *B32B 27/16* (2006.01)
    *B32B 27/20* (2006.01)
    *B32B 38/10* (2006.01)
    *C09J 133/00* (2006.01)
    *C09J 11/04* (2006.01)
    *G09F 3/02* (2006.01)

(52) U.S. Cl.
    CPC ............... *B32B 38/10* (2013.01); *C09J 7/20* (2018.01); *C09J 11/04* (2013.01); *C09J 133/00* (2013.01); *G09F 3/10* (2013.01); *C09J 2203/334* (2013.01); *C09J 2301/41* (2020.08); *C09J 2301/414* (2020.08); *C09J 2433/006* (2013.01); *G09F 3/02* (2013.01)

(58) Field of Classification Search
    CPC ...... C09J 11/04; C09J 133/00; C09J 2301/41; C09J 2301/414; C09J 2203/334; C09J 2433/006; G09F 3/02; G09F 3/10
    See application file for complete search history.

(56) References Cited

U.S. PATENT DOCUMENTS

| | | | |
|---|---|---|---|
| 2007/0088118 A1* | 4/2007 | Dungworth | ............ C09J 133/14 524/555 |
| 2008/0106002 A1* | 5/2008 | Feldman | ................ B42D 25/00 264/400 |
| 2013/0040136 A1 | 2/2013 | Siebert et al. | |

FOREIGN PATENT DOCUMENTS

| | | | |
|---|---|---|---|
| JP | 2002332465 A | * | 11/2002 |
| JP | 2003114621 A | | 4/2003 |
| JP | 2010214796 A | | 9/2010 |
| KR | 20060027501 A | | 3/2006 |
| KR | 20130018625 A | | 2/2013 |
| KR | 20150019625 A | | 2/2015 |

OTHER PUBLICATIONS

Search report from International Application No. PCT/KR2017/003970, dated Aug. 1, 2017.
Database WPI 1-15, Week 201067, Thomson Scientific, London, GB; AN 2010-M49839, XP002790674.
Extended European Search Report including the Written Opinion for Application No. EP 17782665.8 dated May 2, 2019, 6 pages.

* cited by examiner

[Figure 1]
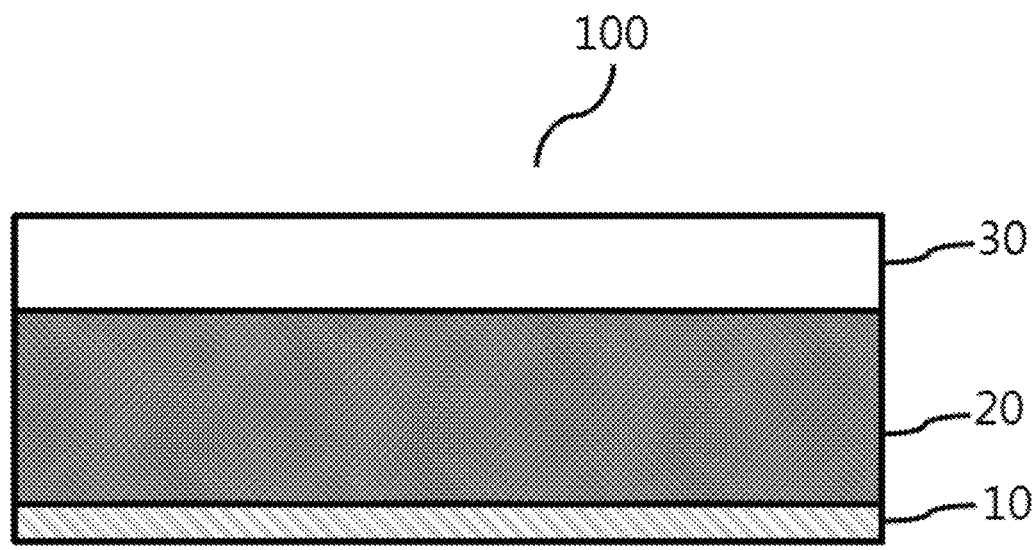

[Figure 2A]
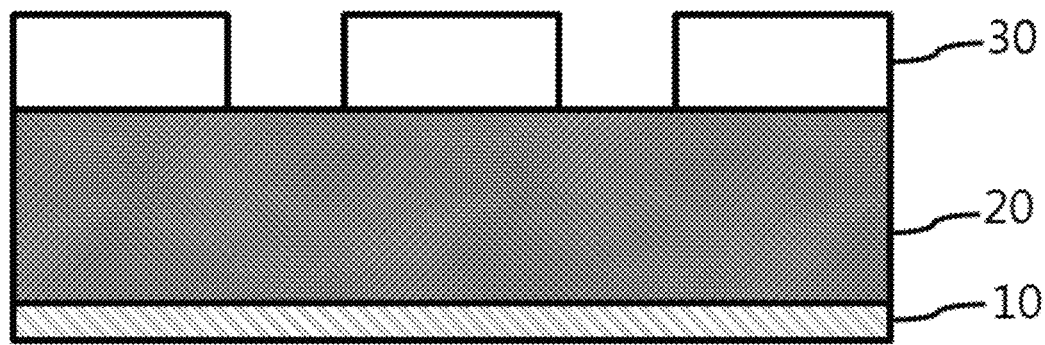
[Figure 2B]
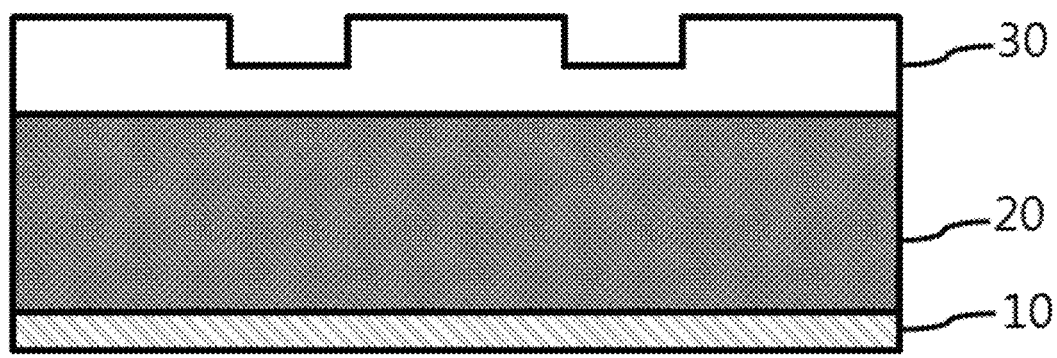

[Figure 3A]
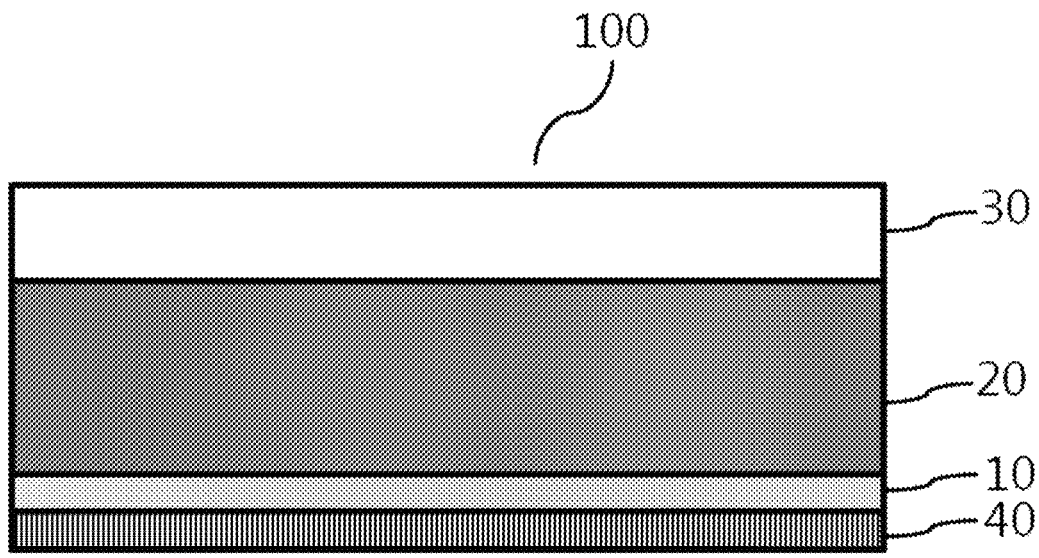
[Figure 3B]
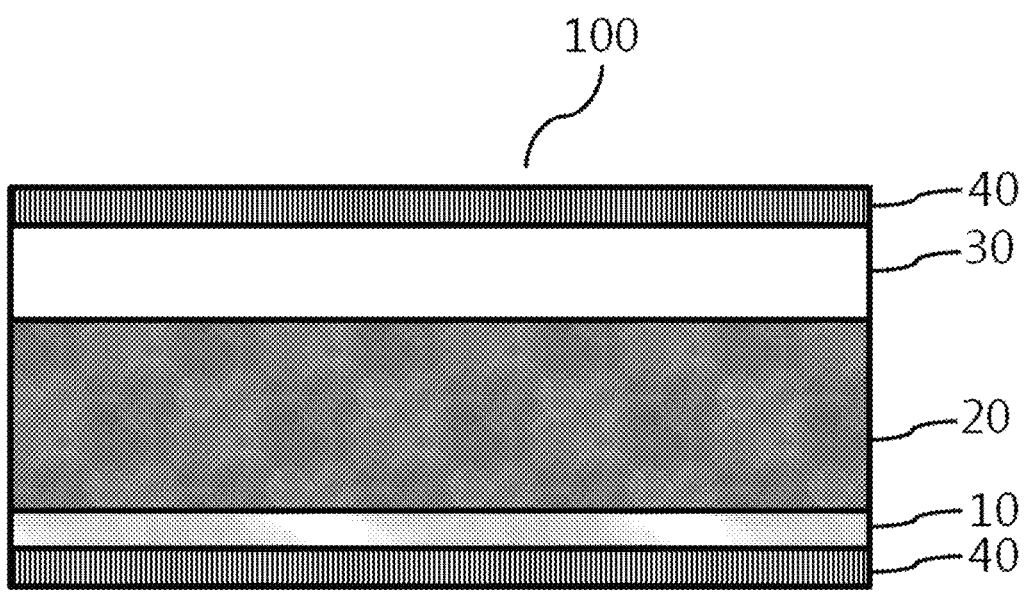

MULTILAYER MARKING FILM AND MANUFACTURING METHOD FOR MULTILAYER MARKING FILM

CROSS-REFERENCE TO RELATED APPLICATIONS

The present application is a national phase entry under 35 U.S.C. § 371 of International Application No. PCT/KR2017/003970 filed Apr. 12, 2017, which claims priority from Korean Patent Application No. 10-2016-0045164 filed in the Korean Intellectual Property Office on Apr. 12, 2016, the entire contents of which are incorporated herein by reference.

TECHNICAL FIELD

The present invention relates to a multilayer marking film and a method for manufacturing a multilayer marking film.

BACKGROUND ART

Various articles have labels for an inherent discriminant function. These labels include various information on an article, and also perform an inherent discriminant function. For example, the labels used in the automobile industry display information on various parts of a vehicle, such as, for example, tire pressure or a fuel type, or are used in order to display inherent security information such as, for example, (a chassis number and a vehicle identification number. In the case of theft or an accident, the labels enable chasing of vehicles.

As a method of preparing the label, information may be written in by using a laser. The laser is a high-powered light source and is easily used for machine processing, and for example, Korean Patent Application Laid-Open No. 10-2006-0027501 discloses an adhesive label sheet capable of marking a large quantity of barcodes quickly by using a laser, and Japanese Patent Application Laid-Open No. 1990-120042 discloses a heat-resistant display material having a layer to be marked, in which an etching pattern is formed by laser beams on a heat-resistant base layer.

The label needs to have a physical property capable of being precisely processed by the laser, have an excellent attaching property to an adherend, and simultaneously implement various physical properties suitable for use and purpose. Therefore, there is a need for studies for controlling the physical property of a label according to each use and purpose.

DETAILED DESCRIPTION OF THE INVENTION

Technical Problem

The present invention relates to a multilayer marking film and a method for manufacturing a multilayer marking film.

Technical Solution

An exemplary embodiment of the present invention provides a multilayer marking film including: an adhesive layer; a colored base layer having a first color; and a colored coating layer having a second color, in which the first color and the second color are different from each other, the colored coating layer, the colored base layer, and the adhesive layer are sequentially provided, the colored base layer includes a cured material of a base composition including: a urethane (meth)acrylate oligomer; a (meth)acrylate monomer including one or more selected from the group consisting of a cyclo-aliphatic (meth)acrylate monomer, an epoxy-based (meth)acrylate monomer, an aliphatic (meth)acrylate monomer, and a polyol-based (meth)acrylate monomer; and a pigment, and the colored coating layer is etched by laser irradiation.

Another exemplary embodiment of the present invention provides a method for manufacturing a multilayer marking film, the method including: applying, onto one surface of a release film, a base composition including: a urethane (meth)acrylate oligomer; a (meth)acrylate monomer including one or more selected from the group consisting of a cyclo-aliphatic (meth)acrylate monomer, an epoxy-based (meth)acrylate monomer, an aliphatic (meth)acrylate monomer, and a polyol-based (meth)acrylate monomer; and a pigment; forming a laminate including a colored base layer having a first color by laminating an additional release film on the base composition and curing the base composition; removing one release film of the release film and the additional release film from the laminate and forming a colored coating layer having a second color, which is a color different from the first color, on one surface of the colored base layer from which the one release film is removed; and removing the other release film from the laminate, and forming an adhesive layer on the other surface of the colored base layer from which the other release film is removed.

Still another exemplary embodiment of the present invention provides a method for manufacturing a multilayer marking film, the method including: forming a laminate including a colored coating layer having a first color by applying, onto one surface of a release film, a coating composition including: a UV-curable oligomer or an electron beam-curable oligomer; and a pigment and curing the coating composition; applying, onto one surface of the colored coating layer, a base composition including: a urethane (meth)acrylate oligomer; a (meth)acrylate monomer including one or more selected from the group consisting of a cyclo-aliphatic (meth)acrylate monomer, an epoxy-based (meth)acrylate monomer, an aliphatic (meth)acrylate monomer, and a polyol-based (meth)acrylate monomer; and a pigment; forming a colored base layer having a second color, which is a color different from the first color, by laminating an additional release film on the base composition and curing the base composition; and removing the additional release film and forming an adhesive layer on the other surface of the colored base layer from which the additional release film is removed.

Advantageous Effects

According to an exemplary embodiment of the present invention, the multilayer marking film has an advantage in that when the multilayer marking film is applied to a final article for various purposes and then an action to remove the film is performed, the film is easily destroyed by a small external force, and as a result, the performance of preventing forgery and alteration is improved.

BRIEF DESCRIPTION OF DRAWINGS

FIG. 1 is a view schematically illustrating a cross-section of a multilayer marking film according to an exemplary embodiment of the present invention.

FIGS. 2A and 2B are views schematically illustrating a multilayer marking film marked by laser irradiation according to an exemplary embodiment of the present invention.

FIGS. 3A and 3B are views schematically illustrating a cross-section of a multilayer marking film according to another exemplary embodiment of the present invention.

MODE FOR INVENTION

When one member is disposed "on" another member in the present specification, this includes not only a case where the one member is brought into contact with another member, but also a case where still another member is present between the two members. When one part "includes" one constituent element in the present specification, unless otherwise specifically described, this does not mean that another constituent element is excluded, but means that another constituent element may be further included. Further, in the present invention, "(meth)acrylate" is used to collectively refer to acrylate and methacrylate.

Hereinafter, the present specification will be described in more detail.

An exemplary embodiment of the present invention provides a multilayer marking film including: an adhesive layer; a colored base layer having a first color; and a colored coating layer having a second color, in which the first color and the second color are different from each other, the colored coating layer, the colored base layer, and the adhesive layer are sequentially provided, the colored base layer includes a cured material of a base composition including: a urethane (meth)acrylate oligomer; a (meth)acrylate monomer including one or more selected from the group consisting of a cyclo-aliphatic (meth)acrylate monomer, an epoxy-based (meth)acrylate monomer, an aliphatic (meth)acrylate monomer, and a polyol-based (meth)acrylate monomer; and a pigment, and the colored coating layer is etched by laser irradiation.

According to an exemplary embodiment of the present invention, the multilayer marking film has an advantage in that when the multilayer marking film is applied to a final article for various purposes and then an action to remove the film is performed, the film is easily destroyed by a small external force, and as a result, the performance of preventing forgery and alteration is improved.

FIG. 1 is a view schematically illustrating a multilayer marking film according to an exemplary embodiment of the present invention. Referring to FIG. 1, a multilayer marking film 100 includes an adhesive layer 10, a colored base layer 20, and a colored coating layer 30, and the colored coating layer 30, the colored base layer 20, and the adhesive layer 10 are sequentially provided. Specifically, the colored base layer 20 may be formed under the colored coating layer 30, and the adhesive layer 10 may be formed under the colored base layer 20.

According to an exemplary embodiment of the present invention, the colored coating layer is etched by laser irradiation, and may have the markability by laser irradiation for removing the etched portion. The multilayer marking film is a film in which various information may be written in by laser irradiation, and the 'marking' means that information is written in the film by etching caused by laser irradiation. Specifically, the marking by laser irradiation may be performed on the colored coating layer included in the multilayer marking film. Specifically, the laser-irradiated portion of the colored coating layer is etched and removed, and simultaneously, interacted with the colored base layer, so that various letters, designs, and the like may be written in.

FIGS. 2A and 2B are views schematically illustrating a multilayer marking film marked by laser irradiation according to an exemplary embodiment of the present invention. As illustrated in FIG. 2A, marking by laser may be performed by the thickness of the colored coating layer 30, and as in FIG. 2B, marking by laser may be performed on a portion of the thickness of the colored coating layer 30.

According to an exemplary embodiment of the present invention, both the colored base layer and the colored coating layer are layers having a color, and the meaning of 'colored' indicates that the base layer or the coating layer is not transparent, and has a color such as white, black, and blue. Specifically, the colored base layer has a first color, the colored coating layer has a second color, and the first color and the second color are different from each other.

Since the colored base layer and the colored coating layer have different colors from each other, various colors may be exhibited depending on an etching depth of an etched portion when the colored coating layer is etched by a laser.

Referring to FIG. 2A, when an etching is performed by the thickness of the colored coating layer 30 by using a laser, a user may visually recognize only the first color of the colored base layer 20 with regard to the etched portion of the colored coating layer 30. Further, as in FIG. 2B, when a portion of the thickness of the colored coating layer 30 is etched by a laser, with regard to the etched portion of the colored coating layer 30, a user may visually recognize a color expressed by the overlapping of the first color of the colored base layer 20 and the second color of the colored coating layer 30 remaining without being etched. Accordingly, depending on the thickness of the colored coating layer 30 to be etched, a color which a user may recognize may be adjusted.

According to an exemplary embodiment of the present invention, the multilayer marking film can be written with letters or designs having various colors by performing laser irradiation on the colored coating layer. For example, the multilayer marking film may be used for an automobile, and may be used in order to display information on various parts of a vehicle, such as tire pressure or a fuel type, or in order to display inherent security information such as a chassis number and a vehicle identification number.

When important information is written in the multilayer marking film, the information needs to be prevented from being forged or altered. Specifically, the multilayer marking film may have 'friability'. The 'friability' means a physical property in which when the multilayer marking film is attached to an adherend, and then an attempt to detach or remove the film is made, the original form is destroyed, and as a result, the multilayer marking film cannot be recycled. The multilayer marking film has friability and thus may secure characteristics in which inherent information written in the multilayer marking film cannot be arbitrarily changed, and the multilayer marking film cannot be forged or altered.

According to an exemplary embodiment of the present invention, it is possible to implement a multilayer marking film which has significantly improved friability by appropriately controlling the composition of the colored base layer. Specifically, the colored base layer includes a cured material of a base composition including a urethane (meth) acrylate-based oligomer and a (meth)acrylate monomer as a matrix constituting the colored base layer.

According to an exemplary embodiment of the present invention, the colored base layer includes a cured material of a base composition including: a urethane (meth)acrylate oligomer; and a (meth)acrylate monomer including one or more selected from the group consisting of a cyclo-aliphatic (meth)acrylate monomer, an epoxy-based (meth)acrylate monomer, an aliphatic (meth)acrylate monomer, and a polyol-based (meth)acrylate monomer.

According to an exemplary embodiment of the present invention, the urethane (meth)acrylate oligomer is an oligomer including a urethane structure (—CONH—) in the chemical structure, and may be advantageous in easily adjusting the molecular weight, improving the friability of the colored base layer, and adjusting the elongation, as compared to an oligomer including another chemical structure. Further, it is possible to be advantageous in appropriately securing the interfacial attaching strength between the colored base layer and the adhesive layer and between the colored base layer and the colored coating layer by using the urethane (meth)acrylate oligomer.

According to an exemplary embodiment of the present invention, the urethane (meth)acrylate oligomer may be obtained from an isocyanate compound including three or more and six or less of isocyanate groups and a compound including a hydroxy group and an acrylate group, such as hydroxyethyl acrylate, hydroxypropyl acrylate, and hydroxybutyl acrylate.

According to an exemplary embodiment of the present invention, the urethane (meth)acrylate oligomer may have a weight average molecular weight of 2,000 g/mol or more and 10,000 g/mol or less. Specifically, the urethane (meth)acrylate oligomer may have a weight average molecular weight of 2,000 g/mol or more and 8,000 g/mol or less, or 2,000 g/mol or more and 5,000 g/mol or less. A urethane (meth)acrylate oligomer having a weight average molecular weight of 2,000 g/mol or more and 10,000 g/mol or less is included in the base composition, so that the cured material of the base composition may have a dense curing structure, and an excellent interfacial attaching property may be secured between the colored base layer and the adhesive layer and between the colored base layer and the colored coating layer. Further, the colored base layer including the cured material of the base composition may greatly contribute to an improvement in friability of the multilayer marking film, and a urethane (meth)acrylate oligomer having a weight average molecular weight of 2,000 g/mol or more and 10,000 g/mol or less may constitute a base matrix of the colored base layer to easily secure durability of the colored base layer.

Therefore, according to an exemplary embodiment of the present invention, the friability, tensile strength, and elongation of the colored base layer including the cured material of the base composition may be controlled by adjusting the weight average molecular weight of the urethane (meth)acrylate oligomer, so that mechanical properties of a multilayer marking film to be manufactured may be effectively improved.

According to an exemplary embodiment of the present invention, the urethane (meth)acrylate oligomer may include three or more and six or less of (meth)acrylate groups. Specifically, the urethane (meth)acrylate oligomer may include: a urethane (meth)acrylate oligomer including 3 or more and 4 or less of (meth)acrylate groups; a urethane (meth)acrylate oligomer including five or more and six or less of (meth)acrylate groups; or a mixture thereof. The urethane (meth)acrylate oligomer including three (meth) acrylate groups or the urethane (meth)acrylate oligomer including four (meth)acrylate groups may impart excellent friability to the colored base layer as a curing reaction with the (meth)acrylate monomer is carried out. Further, the urethane (meth)acrylate oligomer including five (meth)acrylate groups or the urethane (meth)acrylate oligomer including six (meth)acrylate groups may impart excellent friability and mechanical properties to the colored base layer as a curing reaction is carried out in the oligomer itself. In addition, the friability and durability of the colored base layer may be more improved by using a urethane (meth) acrylate oligomer in which a urethane (meth)acrylate oligomer including three or more and four or less of (meth) acrylate groups and a urethane (meth)acrylate oligomer including five or more and six or less of (meth)acrylate groups are mixed.

Therefore, according to an exemplary embodiment of the present invention, physical properties of the colored base layer may be easily controlled by adjusting the number of functional groups of the urethane (meth)acrylate oligomer included in the base composition.

According to an exemplary embodiment of the present invention, the (meth)acrylate monomer includes one or more selected from the group consisting of a cyclo-aliphatic (meth)acrylate monomer, an epoxy-based (meth)acrylate monomer, an aliphatic (meth)acrylate monomer, and a polyol-based (meth)acrylate monomer. The (meth)acrylate monomer may interact with the urethane (meth)acrylate oligomer by including a monomer having the above-described type of chemical structure, thereby greatly improving the friability of the multilayer marking film.

According to an exemplary embodiment of the present invention, the (meth)acrylate monomer may have a weight average molecular weight of 200 g/mol or more and 500 g/mol or less. Specifically, the (meth)acrylate monomer may have a weight average molecular weight of 200 g/mol or more and 400 g/mol or less. The (meth)acrylate monomer may include one or more selected from the group consisting of a cyclo-aliphatic (meth)acrylate monomer, an epoxy-based (meth)acrylate monomer, an aliphatic (meth)acrylate monomer, and a polyol-based (meth)acrylate monomer, and the monomers included in the (meth)acrylate monomer may each independently have a weight average molecular weight of 200 g/mol or more and 500 g/mol or less. For example, when the (meth)acrylate monomer includes a cyclo-aliphatic (meth)acrylate monomer and an aliphatic (meth)acrylate monomer, the cyclo-aliphatic (meth)acrylate monomer and the aliphatic (meth)acrylate monomer may each have a weight average molecular weight of 200 g/mol or more and 500 g/mol or less.

According to an exemplary embodiment of the present invention, a (meth)acrylate monomer having a weight average molecular weight of 200 g/mol or more and 500 g/mol or less is cross-linked to the urethane (meth)acrylate oligomer, which serves as a matrix, through a curing reaction, thereby implementing a colored base layer which is dense and has high hardness.

According to an exemplary embodiment of the present invention, it is possible to implement a colored base layer, which has a dense structure due to the high curing density and simultaneously secures excellent reliability, by adjusting the weight average molecular weights of the urethane (meth) acrylate oligomer and the (meth)acrylate monomer, which are included in the base composition, within the aforementioned ranges. Furthermore, since it is possible to secure a high tensile strength and an appropriate elongation of the colored base layer, it is possible to implement a multilayer marking film having excellent friability and workability.

According to an exemplary embodiment of the present invention, the (meth)acrylate monomer may include two or more and four or less of (meth)acrylate groups. The (meth)acrylate monomer may include one or more selected from the group consisting of a cyclo-aliphatic (meth)acrylate monomer, an epoxy-based (meth)acrylate monomer, an aliphatic (meth)acrylate monomer, and a polyol-based (meth)acrylate monomer, and the monomers included in the (meth)acrylate monomer may each independently include two or more and four or less of (meth)acrylate groups. Further, the (meth)acrylate group which the monomer includes may be a photoreactive functional group.

According to an exemplary embodiment of the present invention, the (meth)acrylate monomer including two or more and four or less of (meth)acrylate groups is cured with the urethane (meth)acrylate oligomer, thereby effectively improving the friability of the colored base layer.

According to an exemplary embodiment of the present invention, the cyclo-aliphatic (meth)acrylate monomer may include one or more substituents selected from the group consisting of a cycloalkyl group having 3 to 25 carbon atoms and a heterocycloalkyl group having 2 to 25 carbon atoms. The heterocycloalkyl group having 2 to 25 carbon atoms may include nitrogen, sulfur, or oxygen as a heterogeneous element. The friability of the colored base layer may be more improved by using a cyclo-aliphatic (meth)acrylate monomer including a heterocycloalkyl group.

Specifically, the cyclo-aliphatic (meth)acrylate monomer may include one selected from the group consisting of cyclohexanedimethanol diacrylate, tricyclodecane dimethanol diacrylate, and a combination thereof. According to an exemplary embodiment of the present invention, the epoxy-based (meth)acrylate monomer may include one or more selected from the group consisting of a novolac type epoxy (meth)acrylate, a bisphenol-A type epoxy (meth)acrylate, a bisphenol-S type epoxy (meth)acrylate, a bisphenol-F type epoxy (meth)acrylate, a phenol type epoxy (meth)acrylate, and a cresol novolac type epoxy (meth)acrylate.

Further, the aliphatic (meth)acrylate monomer may be a compound having a (meth)acrylate group at each of both ends of a main chain composed of an alkylene structural unit having 1 to 16 carbon atoms. Specifically, the aliphatic (meth)acrylate monomer may include one or more selected from the group consisting of 1,6-hexanediol di(meth)acrylate, 1,3-butanediol di(meth)acrylate, and 1,4-butanediol di(meth)acrylate.

According to an exemplary embodiment of the present invention, the polyol-based (meth)acrylate monomer may include at least one selected from the group consisting of 1,6-hexanediol(ethoxylate)diacrylate, tripropylene glycol diacrylate, dipropylene glycol diacrylate, triethylene glycol diacrylate, and tetraethylene glycol diacrylate.

According to an exemplary embodiment of the present invention, the multilayer marking film has significantly excellent friability. Further, the interface between the colored base layer and the colored coating layer may have an appropriate interfacial attaching property so that letters and designs with a fine width may be written in because the colored coating layer is removed from the colored base layer by laser marking. In addition, the interface between the colored base layer and the adhesive layer may secure an interfacial attaching property capable of implementing long-term durability when the multilayer marking film is applied to and firmly attached to a final article.

According to an exemplary embodiment of the present invention, the colored base layer is an intermediate layer provided between the colored coating layer and the adhesive layer, and it is possible to improve the friability, durability, and the like of the multilayer marking film by controlling the composition of the colored base layer.

According to an exemplary embodiment of the present invention, the content of the (meth)acrylate monomer of the base composition may be more than 0 part by weight and 66 parts by weight or less based on 100 parts by weight of the urethane (meth)acrylate oligomer. Specifically, the content of the (meth)acrylate monomer may be 5 parts by weight or more and 40 parts by weight or less, 5 parts by weight or more and 30 parts by weight or less, or 25 parts by weight or more and 40 parts by weight or less, based on 100 parts by weight of the urethane (meth)acrylate oligomer.

According to an exemplary embodiment of the present invention, the colored base layer may have excellent friability by using the (meth)acrylate monomer at a content within the above-described range, and a colored base layer with improved durability and workability may be formed by improving the hardness and elongation of the cured material of the base composition.

Therefore, according to an exemplary embodiment of the present invention, the friability, durability, and workability of the multilayer marking film are improved by adjusting the content of the (meth)acrylate monomer, so that the multilayer marking film is applied to adherends having various forms, and as a result, an inherent discriminant function may be performed, and simultaneously, functions of preventing theft and preventing forgery may be performed.

According to an exemplary embodiment of the present invention, the base composition includes a pigment as a component for imparting a color to the colored base layer. The pigment is not particularly limited in type, and various pigments may be used either alone or in an appropriate mixture thereof depending on the color of the colored base layer.

According to an exemplary embodiment of the present invention, the pigment included in the base composition may include one or more selected from the group consisting of titanium dioxide ($TiO_2$), carbon black, iron and stone, an azo-based pigment, cobalt violet, cadmium sulfide, chromate, ferocyanide, silicate, phosphate, a phthalocyanine-based compound, and a dioxazine-based compound.

According to an exemplary embodiment of the present invention, the content of the pigment of the base composition may be 50 parts by weight or more and 135 parts by weight or less based on 100 parts by weight of the urethane (meth)acrylate oligomer. Specifically, the content of the pigment may be 60 parts by weight or more and 120 parts by weight or less, 70 parts by weight or more and 100 parts by weight or less, or 80 parts by weight or more and 120 parts by weight or less, based on 100 parts by weight of the urethane (meth)acrylate oligomer.

When the content of the pigment is less than 50 parts by weight based on 100 parts by weight of the urethane (meth)acrylate oligomer, the effect may deteriorate in terms of contrast with a color of the colored coating layer, and there may occur a problem in that the friability of the colored base layer deteriorates. Further, when the content of the pigment is more than 135 parts by weight, the reaction efficiency of the curing process of the base composition may be decreased, and it may be difficult for the colored base layer to secure an appropriate interfacial attaching property and friability.

Therefore, according to an exemplary embodiment of the present invention, the color of the colored base layer may be effectively shown without degrading mechanical properties of the colored base layer by adjusting the content of the pigment included in the base composition to 50 parts by weight or more and 135 parts by weight or less based on 100 parts by weight of the urethane (meth)acrylate oligomer.

According to an exemplary embodiment of the present invention, the base composition may be cured by an electron beam or UV rays. That is, the cured material of the base composition may be an electron beam cured material or a UV ray-cured material. When the base composition is cured by using heat or the other curing means, the curing slowly proceeds with less energy, so that there may occur a problem in that a desired physical property cannot be implemented because the friability of the colored base layer deteriorates and the elongation is extremely increased. In contrast, according to an exemplary embodiment of the present invention, the friability of the colored base layer to be manufactured may be easily secured by curing the base composition using an electron beam or UV rays capable of instantaneously adding a large amount of energy.

According to an exemplary embodiment of the present invention, when the base composition is cured by UV rays, the base composition may further include a photoinitiator. As the photoinitiator, a publicly-known material may be used, and the material is not limited as long as the material can initiate photocuring of the base composition by UV irradiation. In contrast, when the base composition is cured by an electron beam, a separate photoinitiator may not be added to the base composition.

According to an exemplary embodiment of the present invention, the base composition may be cured by using an electron beam having energy of 20 kGy or more and 80 kGy or less. Further, the base composition may be cured by irradiating a UV ray having a wavelength value of 200 nm or more and 450 nm or less.

The colored base layer may easily implement friability at a target level by curing the base composition using an electron beam having energy within the range or a UV ray having a wavelength value within the range.

Referring to FIG. 1, the multilayer marking film 100 includes the colored coating layer 30 provided on one surface of the colored base layer 20. The colored coating layer 30 is a layer to be marked, and is a layer which may be etched by laser irradiation and thus removed from the colored base layer 20.

According to an exemplary embodiment of the present invention, the colored coating layer may include a cured material of a coating composition including: a UV-curable oligomer or an electron beam-curable oligomer; and a pigment.

According to an exemplary embodiment of the present invention, the colored coating layer may be cured by UV rays or an electron beam, thereby implementing excellent reliability of the colored coating layer as compared to the other curing means such as thermal curing.

The UV-curable oligomer or the electron beam-curable oligomer may each independently include one or more selected from the group consisting of a difunctional bisphenol A-based epoxy acrylate oligomer, a trifunctional urethane acrylate oligomer, and a hexafunctional urethane acrylate oligomer.

The UV-curable oligomer or the electron beam-curable oligomer may each independently have a weight average molecular weight of 300 g/mol or more and 3,000 g/mol or less. Specifically, the UV-curable oligomer or the electron beam-curable oligomer may have a weight average molecular weight of 300 g/mol or more and 2,000 g/mol or less. By using the UV-curable oligomer or the electron beam-curable oligomer having a weight average molecular weight of 300 g/mol or more and 3,000 g/mol or less, the durability of the colored coating layer and marking precision by laser irradiation may be improved.

According to an exemplary embodiment of the present invention, the coating composition including the UV-curable oligomer may further include a photoinitiator. As the photoinitiator, a publicly-known material may be used, and the material is not limited as long as the material can initiate photocuring of the coating composition by UV irradiation. In contrast, when the coating composition includes the electron beam-curable oligomer, a separate photoinitiator may not be added to the coating composition.

According to an exemplary embodiment of the present invention, the coating composition includes a pigment for implementing a color, and the pigment may be variously selected within a range in which the colored base layer and the colored coating layer implement different colors from each other. Specifically, as the pigment included in the coating composition, it is possible to include at least one selected from the group consisting of titanium dioxide ($TiO_2$), carbon black, iron and stone, an azo-based pigment, cobalt violet, cadmium sulfide, chromate, ferocyanide, silicate, phosphate, a phthalocyanine-based compound, and a dioxazine-based compound.

According to an exemplary embodiment of the present invention, the colored base layer and the colored coating layer may implement different colors from each other by including different pigments from each other. Specifically, the colored base layer may display white by including titanium dioxide ($TiO_2$) as a pigment, and the colored coating layer may display black by including carbon black as a pigment. Further, the colored base layer and the colored coating layer may also implement different colors from each other by including the same pigment and adjusting the contents thereof.

According to an exemplary embodiment of the present invention, the content of the pigment included in the coating composition may be 1 part by weight or more and 20 parts by weight or less based on 100 parts by weight of the UV-curable oligomer or the electron beam-curable oligomer. By adjusting the content of the pigment to the range, the adhesion strength of a colored coating layer to a colored base layer may be easily secured, and the color of the colored base layer may be appropriately implemented, and as a result, the marking performance by laser irradiation may be improved.

Referring to FIG. 1, the multilayer marking film 100 includes the adhesive layer 10 provided on one surface of the colored base layer 20. The adhesive layer 10 is a layer which imparts an adhesive property to a final article when the multilayer marking film 100 is applied to the final article. The multilayer marking film may exhibit a high attaching strength to a finally applied article through the adhesive layer, and may implement improved friability by including both the adhesive layer and the colored base layer.

According to an exemplary embodiment of the present invention, the adhesive layer may include a thermally cured material of an adhesive composition including a thermosetting acrylic resin and a thermal curing agent. The thermosetting acrylic resin may include a polymer or a copolymer of a mixed monomer including one or more selected from the group consisting of ethylhexyl (meth)acrylate, methyl (meth)acrylate, butyl (meth)acrylate, acrylic acid, and glycidyl (meth)acrylate. By using a thermosetting acrylic resin including the polymer or the copolymer of the mixed monomer, it is possible to implement a multilayer marking film having excellent long-term reliability against an exposure to an automobile-related solution and excellent light fastness while increasing adhesive strength.

According to an exemplary embodiment of the present invention, a thermosetting acrylic resin used in the adhesive composition may have a weight average molecular weight of 500,000 g/mol or more and 1,500,000 g/mol or less. The adhesive composition may easily implement an adhesive layer having excellent long-term reliability and excellent light fastness by using the resin having a weight average molecular weight within the above-described range. Further, the adhesive composition may include a thermal curing agent. The thermal curing agent may be chemically reacted with the thermosetting acrylic resin to form the adhesive layer in the form of a coating film and allow the cured material of the adhesive composition to have an appropriate gel content, and as a result, the adhesive layer may secure an appropriate interfacial attaching property with the colored base layer, and may exhibit a high attaching property to a final article.

Specifically, according to an exemplary embodiment of the present invention, the thermal curing agent may include one or more selected from the group consisting of an isocyanate-based curing agent, an aziridine-based curing agent, a metal chelate-based curing agent, 2,2-dimethoxy-1,2-diphenylethan-1-one, and 1-hydroxy-cyclohexyl-phenyl-ketone. By using the kind of thermal curing agent, compatibility with the thermosetting acrylic resin may be improved and high curing efficiency may be exhibited.

The adhesive composition may include the thermal curing agent in an amount of about 0.01 part by weight to about 0.5 part by weight based on 100 parts by weight of a solid content of the thermosetting acrylic resin. By adjusting the content of the thermal curing agent to the above-described range, it is possible to easily secure physical properties and benefits of the adhesive layer, and greatly contribute to the friability and durability of the multilayer marking film.

According to an exemplary embodiment of the present invention, the adhesive layer may have an attaching strength of 1,400 gf/cm or more and 4,000 gf/cm or less to an adherend formed of a metal material. Specifically, the attaching strength of the adhesive layer to the adherend formed of a metal material may be 2,000 gf/cm or more and 3,500 gf/cm or less. The adhesive layer is a layer which imparts an adhesive property with a predetermined level to a final article, and the adhesive property of the adhesive layer may affect the friability of the multilayer marking film.

According to an exemplary embodiment of the present invention, the multilayer marking film may include both the adhesive layer and the colored base layer even though the multilayer marking film includes an adhesive layer retaining an attaching strength within the range, thereby easily measuring attaching strength properties without damage or tearing of the multilayer marking film. Further, when the multilayer marking film is applied to a final article, the multilayer marking film may implement a long-term attaching property through an adhesive layer retaining an attaching strength within the range. The multilayer marking film has various uses, and may be utilized as, for example, a label to be attached to an automobile. When the multilayer marking film is applied to a painted plate formed of a metal material for an automobile, a long-term attaching property of the multilayer marking film may be implemented through an adhesive layer exhibiting an attaching strength within the range.

According to an exemplary embodiment of the present invention, the multilayer marking film may implement improved friability by including the colored coating layer, the colored base layer, and the adhesive layer together, and the interfacial attaching property among the respective layers may be appropriately controlled to simultaneously secure precision of the marking by laser irradiation and durability for a final article.

The multilayer marking film may secure characteristics capable of precisely carrying out a marking by laser irradiation by appropriately designing the thickness of each layer, may implement excellent friability, and may secure characteristics in which damage or tearing does not occur during the measurement of attaching strength in spite of a high attaching property.

According to an exemplary embodiment of the present invention, the colored coating layer may have a thickness of 2 μm or more and 4 μm or less. By adjusting the thickness of the colored coating layer to 2 μm or more and 4 μm or less, the efficiency of the marking by laser irradiation may be improved, and an etched colored coating layer may be cleanly removed from the colored base layer, and accordingly, it is possible to easily implement an effect in which the visibility after the laser marking is excellent.

Further, according to an exemplary embodiment of the present invention, the colored base layer may have a thickness of 50 μm or more and 150 μm or less. By forming both a colored coating layer having a thickness of 2 μm or more and 4 μm or less and a colored base layer having a thickness of 50 μm or more and 150 μm or less, during the marking by laser irradiation, the colored base layer may implement excellent durability, and may greatly contribute to an improvement in friability of the multilayer marking film. In addition, the distribution or handling of the multilayer marking film may be facilitated, and when the multilayer marking film is processed to a desired size, punching properties by a laser may be improved.

According to an exemplary embodiment of the present invention, the adhesive layer may have a thickness of 20 μm or more and 50 μm or less. By adjusting the thickness of the adhesive layer to 20 m or more and 50 μm or less, it is possible to greatly improve the friability while securing an attaching property of the multilayer marking film to a final article, and it is possible to easily implement the adhesive performance of the multilayer marking film.

FIGS. 3A and 3B are views schematically illustrating a cross-section of a multilayer marking film according to another exemplary embodiment of the present invention. Referring to FIG. 3A and FIG. 3B, a release film 40 may be further provided on one outermost surface or both outermost surfaces of the multilayer marking film 100.

According to an exemplary embodiment of the present invention, the release film 40 is a layer which is removed when the multilayer marking film is applied to a final article, and the release film 40 formed on one surface of the colored coating layer 30 may also be removed before the laser marking, and may also be removed after the laser marking. When the release film 40 is removed after the laser marking, the film may be formed of a material having transmittance with respect to a laser.

According to an exemplary embodiment of the present invention, as the release film, a film which is release-treated with a release agent or a film which is not release-treated may be used. As the release agent, a publicly-known material may be used, and the material is not limited as long as a release film can be release-treated with the material. One surface of the release film release-treated with the release agent may be bonded to the multilayer marking film.

Another exemplary embodiment of the present invention provides a method for manufacturing a multilayer marking film, the method including: applying, onto one surface of a release film, a base composition including: a urethane (meth)acrylate oligomer; a (meth)acrylate monomer including one or more selected from the group consisting of a cyclo-aliphatic (meth)acrylate monomer, an epoxy-based (meth)acrylate monomer, an aliphatic (meth)acrylate monomer, and a polyol-based (meth)acrylate monomer; and a pigment; forming a laminate including a colored base layer having a first color by laminating an additional release film on the base composition and curing the base composition; removing one release film of the release film and the additional release film from the laminate and forming a colored coating layer having a second color, which is a color different from the first color, on one surface of the colored base layer from which the one release film is removed; and removing the other release film from the laminate, and forming an adhesive layer on the other surface of the colored base layer from which the other release film is removed.

The base composition, the coating composition, and the adhesive composition, which are used for the method for manufacturing a multilayer marking film according to another exemplary embodiment of the present invention, may be the same as the base composition, the coating composition, and the adhesive composition, which are used for the multilayer marking film according to an exemplary embodiment of the present invention. Further, as the release film and the additional release film, the same films may also be used, and different films may also be used.

According to still another exemplary embodiment of the present invention, the multilayer marking film may be manufactured by a method of forming a colored base layer including a cured material of the base composition, forming a colored coating layer including a cured material of the coating composition on one surface of the colored base layer, and forming an adhesive layer including a cured material of the adhesive composition on the other surface of the colored base layer. The one surface of the colored base layer may mean a surface brought into contact with the colored coating layer, and the other surface of the colored base layer may mean a surface opposite to the one surface of the colored base layer.

According to yet another exemplary embodiment of the present invention, a laminate having a structure in which a colored base layer is interposed between a release film and an additional release film is formed, and then the colored coating layer and the adhesive layer are formed on both surfaces of the colored base layer, respectively, while sequentially removing the two release films, and as a result, it is possible to easily secure an interfacial attaching property between the respective layers and improve the thickness uniformity of the colored base layer.

According to still yet another exemplary embodiment of the present invention, the forming of the adhesive layer may include directly coating an adhesive composition onto the other surface of the colored base layer, or attaching an adhesive layer including a thermally cured material of the adhesive composition to the other surface of the colored base layer. The adhesive layer may be formed by directly coating an adhesive composition onto the other surface of the colored base layer from which the other release film is removed, and then thermally curing the adhesive composition. Further, a colored coating layer may be formed by manufacturing a transfer film including a cured material of the coating composition and transferring the cured material of the coating composition onto the other surface of the colored base layer through the transfer film.

According to a further exemplary embodiment of the present invention, the method for manufacturing a multilayer marking film may further include performing a corona treatment on the other surface of the colored base layer before the forming of the adhesive layer. The adhesive layer may be formed by performing a corona treatment on the other surface of the colored base layer from which the other release film is removed, directly coating the adhesive composition onto the other surface of the corona-treated colored base layer, and then thermally curing the adhesive composition. The adhesion strength between the colored base layer and the adhesive layer may be improved by performing a corona treatment on the other surface of the colored base layer.

Still another exemplary embodiment of the present invention provides a method for manufacturing a multilayer marking film, the method including: forming a laminate including a colored coating layer having a first color by applying, onto one surface of a release film, a coating composition including: a UV-curable oligomer or an electron beam-curable oligomer; and a pigment, and curing the coating composition; applying, onto one surface of the colored coating layer, a base composition including: a urethane (meth)acrylate oligomer; a (meth)acrylate monomer including one or more selected from the group consisting of a cyclo-aliphatic (meth)acrylate monomer, an epoxy-based (meth)acrylate monomer, an aliphatic (meth)acrylate monomer, and a polyol-based (meth)acrylate monomer; and a pigment; forming a colored base layer having a second color, which is a color different from the first color, by laminating an additional release film on the base composition and curing the base composition; and removing the additional release film and forming an adhesive layer on the other surface of the colored base layer from which the additional release film is removed.

The base composition, the coating composition, and the adhesive composition, which are used for the method for manufacturing a multilayer marking film according to still another exemplary embodiment of the present invention, may be the same as the base composition, the coating composition, and the adhesive composition, which are used for the multilayer marking film according to an exemplary embodiment of the present invention.

According to yet another exemplary embodiment of the present invention, the multilayer marking film may be manufactured by a method of forming a colored coating layer including a cured material of the coating composition, forming a colored base layer including a cured material of the base composition on one surface of the colored coating layer, and forming an adhesive layer including a cured material of the adhesive composition on the other surface of the colored base layer.

Specifically, a colored coating layer may be formed by applying the coating composition onto one surface of a release film and curing the coating composition, and the base composition may be applied onto one surface of the colored coating layer. The one surface of the colored coating layer may mean a surface opposite to a surface of the colored coating layer brought into contact with the release film. Thereafter, a colored base layer may be formed by laminating an additional release film on the base composition and curing the base composition. The additional release film may be removed from the colored base layer, and an adhesive layer may be formed on the other surface of the colored base layer from which the additional release film is removed. The one surface of the colored base layer may mean a surface brought into contact with the colored coating layer, and the other surface of the colored base layer may mean a surface opposite to the one surface of the colored base layer.

According to still yet another exemplary embodiment of the present invention, the forming of the adhesive layer may include directly coating an adhesive composition onto the other surface of the colored base layer, or attaching an adhesive layer including a thermally cured material of the adhesive composition to the other surface of the colored base layer. Specifically, an adhesive layer may be formed by directly coating an adhesive composition onto the other surface of the colored base layer, laminating a separate release film, and then thermally curing the adhesive composition. Further, a laminate including an adhesive layer including a thermally cured material of the adhesive composition and a separate release film is prepared, and the adhesive layer may be laminated onto the other surface of the colored base layer. In addition, as the release film, the additional release film, and the separate release film, the same films may also be used, and different films may also be used.

Therefore, according to a further exemplary embodiment of the present invention, it is possible to provide a multilayer marking film in which a release film, a colored coating layer, a colored base layer, an adhesive layer, and a separate release film are sequentially laminated.

According to another further exemplary embodiment of the present invention, the method for manufacturing a multilayer marking film may further include performing a corona treatment on the other surface of the colored base layer before the forming of the adhesive layer. The adhesion strength between the colored base layer and the adhesive layer may be improved by performing a corona treatment on the other surface of the colored base layer.

Hereinafter, the present invention will be described in more detail through Examples. These Examples are provided for only explaining the present invention, and are not intended to limit the present invention.

EXAMPLE 1

MIRAMER PU340 (manufactured by Miwon Special Chemical Co., Ltd.) having a weight average molecular weight of 2,400 g/mol and being trifunctional as a urethane (meth)acrylate oligomer, 1,6-hexanediol di(meth)acrylate having a weight average molecular weight of 226 g/mol and being difunctional as a cyclo-aliphatic (meth)acrylate monomer, and titanium dioxide ($TiO_2$) as a pigment were prepared.

Thereafter, a base composition including 25 parts by weight of a cyclo-aliphatic (meth)acrylate monomer and 87.5 parts by weight of a pigment based on 100 parts by weight of a urethane (meth)acrylate oligomer were manufactured.

The base composition was applied onto one surface of a polyethylene terephthalate (PET) release film, and the same PET release film was laminated on top of the base composition applied onto the release film. Next, a laminate in which a release film, a colored base layer, and a release film were sequentially provided was manufactured by curing the base composition through electron beam curing with electron beam energy of 40 kGy. One release film was peeled off from the laminate, a coating composition including: 100 parts by weight of a mixture of MIRAMER PU610 (manufactured by Miwon Special Chemical Co., Ltd.) having a weight average molecular weight (Mw) of 1,800 g/mol and being a hexafunctional urethane acrylate oligomer and MIRAMER PE210 (manufactured by Miwon Special Chemical Co., Ltd.) having a weight average molecular weight (Mw) of 520 g/mol and being a difunctional bisphenol A-based epoxy acrylate oligomer as a UV-curable oligomer; and 5 parts by weight of carbon black was applied onto one surface of the colored base layer from which the release film was peeled off, and then a colored coating layer was manufactured by UV-curing the coating composition.

Next, the other release film of the laminate was peeled off, a corona treatment was performed on the other surface of the colored base layer, and then an adhesive composition including 0.04 parts by weight of an aziridine curing agent as a thermal curing agent based on 100 parts by weight of a thermosetting acrylic resin having a weight average molecular weight (Mw) of 1,300,000 g/mol was applied thereon, and an adhesive layer was manufactured by thermally curing the adhesive composition at 110° C. for 3 minutes. As a result, a multilayer marking film including a colored coating layer having a thickness of 2 μm, a colored base layer having a thickness of 100 μm, and an adhesive layer having a thickness of 25 μm was manufactured.

EXAMPLES 2 to 4

A multilayer marking film was manufactured in the same manner as in Example 1, except that the urethane (meth)acrylate oligomer, the (meth)acrylate monomer, and the pigment of the base composition were prepared as shown in the following Table 1.

In the following Table 1, MIRAMER PU340 (manufactured by Miwon Special Chemical Co., Ltd.) having a weight average molecular weight of 2,400 g/mol and being trifunctional was used as a urethane (meth)acrylate oligomer, the cyclo-aliphatic (meth)acrylate monomer was a difunctional 1,3-adamantanediol diacrylate, the epoxy-based (meth)acrylate monomer was difunctional epoxy (meth)acrylate MIRAMER PE230 (manufactured by Miwon Special Chemical Co., Ltd.), and the polyol-based (meth)acrylate monomer was a difunctional 1,6-hexanediol (ethoxylate)diacrylate.

EXAMPLES 5 to 6

A multilayer marking film was manufactured in the same manner as in Example 1, except that the urethane (meth)acrylate oligomer, the (meth)acrylate monomer, and the pigment of the base composition were prepared as shown in the following Table 1, and the base composition was cured by being irradiated with a UV ray having a wavelength value of 200 nm or more and 450 nm or less.

In the following Table 1, MIRAMER PU340 (manufactured by Miwon Special Chemical Co., Ltd.) having a weight average molecular weight of 2,400 g/mol and being trifunctional was used as a urethane (meth)acrylate oligomer, the aliphatic (meth)acrylate monomer was a difunctional 1,6-hexanediol di(meth)acrylate, and the cyclo-aliphatic (meth)acrylate monomer was a difunctional 1,3-adamantanediol diacrylate.

Comparative Examples 1 to 3

A multilayer marking film was manufactured in the same manner as in Example 1, except that the base composition was prepared as shown in the following Table 1. In the following Table 1, the trifunctional urethane (meth)acrylate oligomer was MIRAMER PU340 (manufactured by Miwon Special Chemical Co., Ltd.), and the difunctional urethane (meth)acrylate oligomer was SU01020 (manufactured by Shin-A T&C). Further, the cyclo-aliphatic (meth)acrylate monomer was a difunctional 1,3-adamantanediol diacrylate, and CHMA was cyclohexyl methacrylate.

'NG', and when the broken form was shown during the attempt to detach the sample, the friability was described as 'OK'.

TABLE 1

| | Base composition | | | | | | Pigment (TiO$_2$) |
|---|---|---|---|---|---|---|---|
| | Urethane (meth)acrylate oligomer | | | (Meth)acrylate monomer | | | |
| | Type | Mw (g/mol) | Content (parts by weight) | Type | Mw (g/mol) | Content (parts by weight) | Content (parts by weight) |
| Example 1 | Trifunctional | 2,400 | 100 | Aliphatic | 226 | 25 | 80 |
| Example 2 | Trifunctional | 2,400 | 100 | Cyclo-aliphatic | 276 | 25 | 80 |
| Example 3 | Trifunctional | 2,400 | 100 | Epoxy-based | 400 | 25 | 80 |
| Example 4 | Trifunctional | 2,400 | 100 | Polyol-based | 226 | 25 | 80 |
| Example 5 | Trifunctional | 2,400 | 100 | Cyclo-aliphatic | 276 | 20 | 90 |
| | | | | Aliphatic | 226 | 13 | |
| Example 6 | Trifunctional | 2,400 | 100 | Cyclo-aliphatic | 276 | 12 | 80 |
| | | | | Aliphatic | 226 | 12 | |
| Comparative Example 1 | Trifunctional Difunctional | 2,500 5,000 | 100 25 | | | — | 80 |
| Comparative Example 2 | Trifunctional | 2,400 | 100 | CHMA | 168 | 25 | 80 |
| Comparative Example 3 | Difunctional | 5,000 | 100 | Cyclo-aliphatic | 276 | 25 | 80 |

Experimental Example 1: Measurement of Tensile Strength

For the multilayer making films in the Examples and the Comparative Examples, samples having a rectangular shape with a size of 1 cm×4 cm were prepared, both ends of each sample were fixed by using Texture Analyzer XT Plus (manufactured by Stable Micro Systems Co., Ltd.), the samples were pulled at a rate of 300 mm/min, and then the tensile strength at a break point was measured, and the results are shown in the following Table 2.

Experimental Example 2: Measurement of Elongation

For the multilayer marking films in the Examples and the Comparative Examples, samples having a rectangular shape with a size of 1 cm×4 cm were prepared, both ends of each sample were fixed by using Texture Analyzer XT Plus (manufactured by Stable Micro Systems Co., Ltd.), the samples were pulled at a rate of 300 mm/min, and then the elongation at a break point was measured, and the results are shown in the following Table 2.

Experimental Example 3: Evaluation of Friability

For the multilayer marking films in the Examples and the Comparative Examples, a sample having a size of 75 mm×150 mm was attached to a painted plate formed of an aluminum material, and then the friability was evaluated whether a broken shape was shown during the attempt to forcibly detach the sample by using a knife 1 hour after being exposed to isopropyl alcohol (IPA) at a concentration of 100%, or whether the sample could be detached in the initially attached form as it was, and the results are shown in the following Table 2. When the sample could be detached in the initially attached form as it was, the friability was

TABLE 2

| | Tensile strength (gf) | Elongation (%) | Friability |
|---|---|---|---|
| Example 1 | 4,000 | 9 | OK |
| Example 2 | 4,400 | 6 | OK |
| Example 3 | 5,900 | 8 | OK |
| Example 4 | 3,800 | 15 | OK |
| Example 5 | 5,500 | 8 | OK |
| Example 6 | 4,356 | 11 | OK |
| Comparative Example 1 | 1,200 | 11 | NG |
| Comparative Example 2 | — | — | — |
| Comparative Example 3 | 645 | 14 | NG |

Referring to Table 2, it can be seen that in the case of the multilayer marking films in Examples 1 to 6, the tensile strength satisfies a range of 3,000 gf or more and 6,000 gf or less, and simultaneously, the elongation satisfies 5% or more and 20% or less. Further, it can be seen that the multilayer marking films in Examples 1 to 6 exhibit friability at a required level.

As a result, the multilayer marking film according to an exemplary embodiment of the present invention satisfies tensile strength and elongation within the range, thereby implementing excellent durability, and simultaneously, implementing excellent friability in which the multilayer marking films are broken themselves when an external force at a suitable or more level is applied thereto.

Meanwhile, in the case of Comparative Examples 1 to 3, the tensile strengths and the elongations failed to satisfy the ranges and the friability failed to implement the required level, and particularly, in the case of Comparative Example 2, the measurement could not be made because it was difficult to produce the cured material of the base composition. Therefore, it can be seen that the multilayer marking films according to Comparative Examples 1 and 3 are inferior to those in Examples 1 to 6 of the present invention in terms of durability and friability.

EXPLANATION OF REFERENCE NUMERALS AND SYMBOLS

100: Multilayer marking film
10: Adhesive layer
20: Colored base layer
30: Colored coating layer
40: Release film

The invention claimed is:

1. A multilayer marking film comprising:
an adhesive layer;
a colored base layer having a first color; and
a colored coating layer having a second color,
wherein the first color and the second color are different from each other,
the colored coating layer, the colored base layer, and the adhesive layer are sequentially provided,
the colored base layer comprises a cured material of a base composition comprising:
a urethane (meth)acrylate oligomer;
a (meth)acrylate monomer comprising one or more selected from the group consisting of a cyclo-aliphatic (meth)acrylate monomer, an epoxy-based (meth)acrylate monomer, and an aliphatic (meth)acrylate monomer, wherein the aliphatic (meth)acrylate monomer comprises one or more selected from the group consisting of 1,6-hexanediol di(meth)acrylate, 1,3-butanediol di(meth)acrylate, and 1,4-butanediol di(meth)acrylate; and
a pigment, and
the colored coating layer is etched by laser irradiation.

2. The multilayer marking film of claim 1, wherein the urethane (meth)acrylate oligomer has a weight average molecular weight of 2,000 g/mol or more and 10,000 g/mol or less.

3. The multilayer marking film of claim 1, wherein the urethane (meth)acrylate oligomer comprises three or more and six or less of (meth)acrylate groups.

4. The multilayer marking film of claim 1, wherein the urethane (meth)acrylate oligomer comprises: a urethane (meth)acrylate oligomer comprising three or more and four or less of (meth)acrylate groups; a urethane (meth)acrylate oligomer comprising five or more and six or less of (meth)acrylate groups; or a mixture thereof.

5. The multilayer marking film of claim 1, wherein the (meth)acrylate monomer has a weight average molecular weight of 200 g/mol or more and 500 g/mol or less.

6. The multilayer marking film of claim 1, wherein the (meth)acrylate monomer comprises two or more and four or less of (meth)acrylate groups.

7. The multilayer marking film of claim 1, wherein the cyclo-aliphatic (meth)acrylate monomer comprises one or more substituents selected from the group consisting of a cycloalkyl group having 3 to 25 carbon atoms and a heterocycloalkyl group having 2 to 25 carbon atoms.

8. The multilayer marking film of claim 1, wherein the epoxy-based (meth)acrylate monomer comprises one or more selected from the group consisting of a novolac epoxy (meth)acrylate, a bisphenol-A epoxy (meth)acrylate, a bisphenol-S epoxy (meth)acrylate, a bisphenol-F epoxy (meth)acrylate, a phenol epoxy (meth)acrylate, and a cresol novolac epoxy (meth)acrylate.

9. The multilayer marking film of claim 1, wherein a content of the (meth)acrylate monomer of the base composition is more than 0 part by weight and 66 parts by weight or less based on 100 parts by weight of the urethane (meth)acrylate oligomer.

10. The multilayer marking film of claim 1, wherein a content of the pigment of the base composition is 50 parts by weight or more and 135 parts by weight or less based on 100 parts by weight of the urethane (meth)acrylate oligomer.

11. The multilayer marking film of claim 1, wherein the base composition is cured by an electron beam or UV rays.

12. The multilayer marking film of claim 1, wherein the colored coating layer comprises a cured material of a coating composition comprising: a UV-curable oligomer or an electron beam-curable oligomer; and a pigment.

13. The multilayer marking film of claim 1, wherein the adhesive layer comprises a thermally cured material of an adhesive composition comprising a thermosetting acrylic resin and a thermal curing agent.

* * * * *